(12) United States Patent
Guerin

(10) Patent No.: US 7,826,132 B2
(45) Date of Patent: Nov. 2, 2010

(54) POWER STABILIZATION OF SEMICONDUCTOR LASER HARMONIC FREQUENCY CONVERSION MODULES

(75) Inventor: Nicolas Guerin, San Francisco, CA (US)

(73) Assignee: JDS Eniphase Corporation, Milpitas, CA (US)

(*) Notice: Subject to any disclaimer, the term of this patent is extended or adjusted under 35 U.S.C. 154(b) by 69 days.

(21) Appl. No.: 12/269,453

(22) Filed: Nov. 12, 2008

(65) Prior Publication Data

US 2009/0067454 A1  Mar. 12, 2009

Related U.S. Application Data

(62) Division of application No. 11/944,685, filed on Nov. 26, 2007, now Pat. No. 7,518,786.

(60) Provisional application No. 60/867,212, filed on Nov. 27, 2006.

(51) Int. Cl.
*G02F 1/35* (2006.01)
*G02F 2/02* (2006.01)

(52) U.S. Cl. ........................ 359/328; 359/326

(58) Field of Classification Search ......... 359/326–332; 385/11, 95–99, 122; 372/21, 22
See application file for complete search history.

(56) References Cited

U.S. PATENT DOCUMENTS

| 4,773,753 A | 9/1988 | Hirose et al. ............... 356/35.5 |
| 5,185,752 A | 2/1993 | Welch et al. ................... 372/22 |
| 5,760,948 A | 6/1998 | Bigo ........................... 359/326 |
| 5,909,306 A | 6/1999 | Goldberg et al. ........... 359/337.1 |
| 5,966,391 A | 10/1999 | Zediker et al. |
| 6,014,249 A | 1/2000 | Fermann et al. ........... 359/341.1 |
| 6,418,255 B1 | 7/2002 | Maier ......................... 385/122 |
| 6,683,902 B1 | 1/2004 | Ohki et al. ................... 372/105 |
| 6,996,140 B2 | 2/2006 | Waarts et al. ................. 372/21 |
| 7,034,946 B2 | 4/2006 | Chen et al. ................... 356/466 |
| 2003/0185482 A1 | 10/2003 | Nakajima .................... 385/11 |
| 2005/0226278 A1 | 10/2005 | Gu et al. ........................ 372/6 |
| 2006/0013270 A1 | 1/2006 | Yumoto et al. ................ 372/21 |
| 2007/0230527 A1 | 10/2007 | Sakai et al. ............... 372/43.01 |
| 2008/0137693 A1 | 6/2008 | Kharlamov et al. ........... 372/6 |
| 2008/0144991 A1 | 6/2008 | Penninckx ................... 385/11 |
| 2008/0212916 A1 | 9/2008 | Duesterberg et al. .......... 385/11 |

FOREIGN PATENT DOCUMENTS

| CA | 2577189 | 3/2006 |
| EP | 0214907 | 3/1987 |
| FR | 2874272 | 2/2006 |

*Primary Examiner*—Daniel Petkovsek
(74) *Attorney, Agent, or Firm*—Matthew A. Pequignot; Pequignot + Myers LLC

(57) ABSTRACT

The invention relates to a fiber laser and harmonic frequency conversion module incorporating a 90 degree Polarization Maintaining (PM) fiber fusion splice therebetween for providing temperature insensitive power stabilization. The present invention has found that incorporating at least one 90 degree splice of the transmission axes of the PM fiber, coupling a fast axis to a slow axis, to create substantially equal optical path lengths of the two transmission axes of the fiber coupling can nearly eliminate output amplitude fluctuation within a practical operating temperature range.

11 Claims, 6 Drawing Sheets

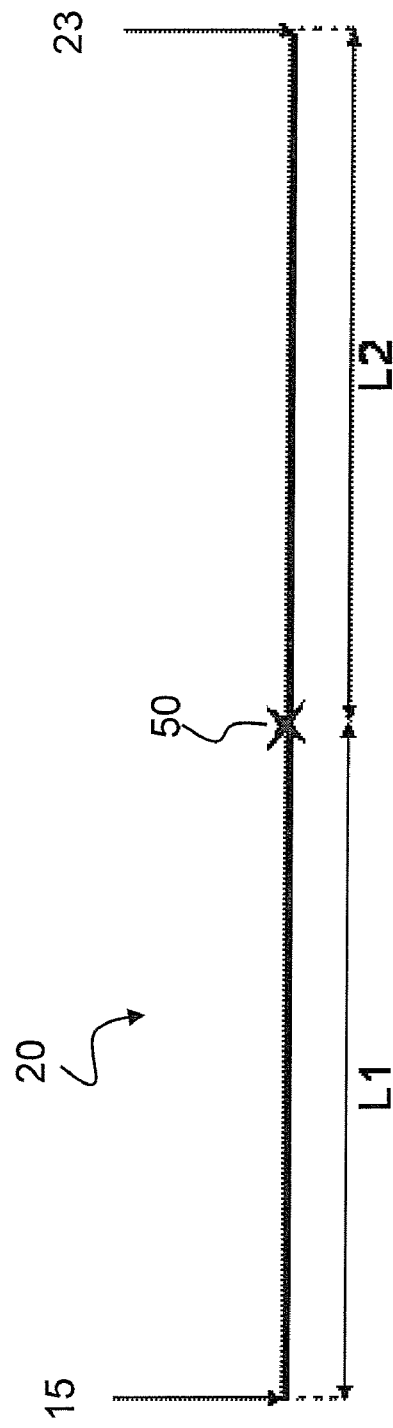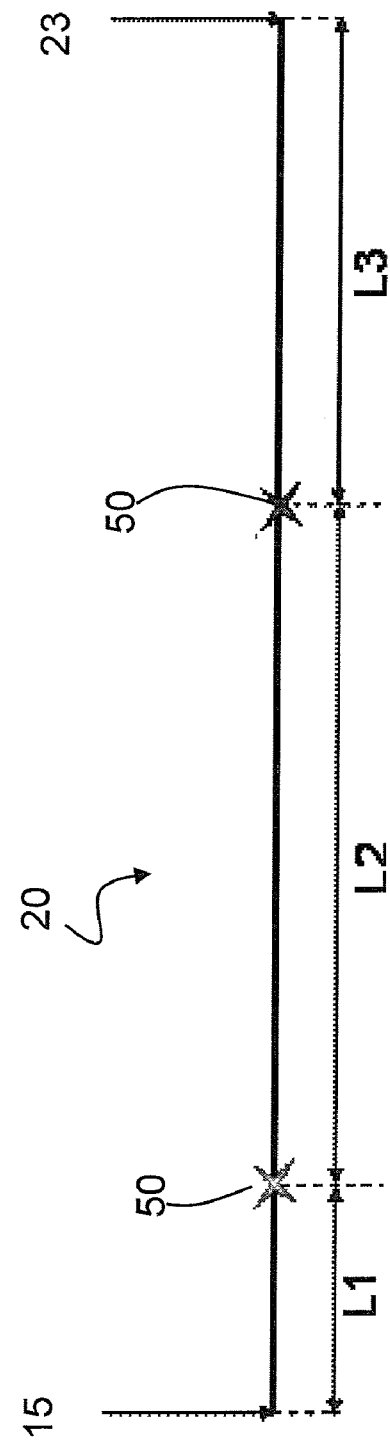
Figure 2A
Figure 2B

POWER STABILIZATION OF SEMICONDUCTOR LASER HARMONIC FREQUENCY CONVERSION MODULES

CROSS-REFERENCE TO RELATED APPLICATIONS

The present application is a divisional application of U.S. patent application Ser. No. 11/944,685, filed on Nov. 26, 2007, now U.S. Pat. No. 7,518,786 entitled "Power Stabilization Of Semiconductor Laser Harmonic Frequency Conversion Modules", which claims priority from U.S. Provisional Patent Application No. 60/867,212 filed Nov. 27, 2006, the disclosures of which are herein incorporated by reference.

MICROFICHE APPENDIX

Not Applicable

TECHNICAL FIELD

The present application relates to a fiber laser and harmonic frequency conversion module incorporating a 90 degree Polarization Maintaining (PM) fiber fusion splice therebetween for providing temperature insensitive power stabilization.

BACKGROUND OF THE INVENTION

Commercially there is a large demand for a stable and economical laser source in the blue to green range including the UV to visible spectrum, for instance for high density optical storage retrieval and biomedical applications. Laser output in this frequency range is provided by coupling a higher frequency semiconductor laser to a non-linear crystal harmonic frequency converter. An example is SHG (second harmonic generation) which generates a second harmonic beam, where the frequency of the second harmonic beam is twice the frequency of the pump beam.

These harmonic frequency converters are highly sensitive to polarization and wavelength. Accordingly, alignment and temperature stability are critical to reliable operation.

Providing an optical fiber coupling between the semiconductor laser and the harmonic frequency converter greatly simplifies alignment issues in assembly. In addition the fiber laser has a well controlled line width including a fiber Bragg grating (FBG) to lock the pump laser at the FBG wavelength. The cavity is formed between the back side of the chip which has an HR (high reflectivity) coating or close to HR (a 95% reflectivity coating is provided in a preferred embodiment, using 5% for photodiode monitoring in the back) and the grating, allowing many modes under the spectral envelope of the grating. The longer the cavity the shorter the mode spacing. Many modes facilitate RMS (root mean square) noise reduction involving mode competition averaging. Therefore, the use of a fiber laser is a simple way to achieve a longer cavity with the wavelength selectivity required.

The optical link between the laser diode and a harmonic frequency converter is a singlemode optical fiber, comprising the laser cavity, the narrow band grating and the optical link to the harmonic frequency converter. Experimentation with a PM fiber link to maintain a polarized output from the laser transmitted to the polarization sensitive converter revealed that this structure does not provide a consistently stable output amplitude.

U.S. Pat. No. 5,966,391 discloses the use of rare earth doped PM fiber for providing gain while simultaneously coupling a single linear polarization into the nonlinear crystal of a harmonic frequency doubler.

U.S. Pat. No. 6,683,902 discloses the use of a 90 degree splice of PM fiber within the cavity of an semiconductor external cavity laser in order to reduce the phase difference within the cavity to reduce the transverse mode competition and stabilize the power of the laser.

It is recognized that PM fiber is temperature sensitive, with changes in temperature causing the birefringence, the $\Delta n$ difference in refractive index between the orthogonal axes, to vary.

In optical fiber sensors, it is recognized that the variation in birefringence of PM fiber can be temperature compensated by splicing two lengths of polarization maintaining fiber at 90 degrees with respect to the fast axis of each, such that the effects of temperature do not cause additional phase shift between light launched into the fast and the slow axes. For example, U.S. Pat. No. 4,773,753 issued Sep. 27, 1988 to Takao Hirose et al. discloses a fiber sensor, including a 90 degree splice of birefringent fibers selected by material or length to eliminate temperature dependent phase change, for measuring temperature or strain.

However, none of the prior art recognizes the problems causing power fluctuations in the output of a fiber laser and harmonic frequency conversion module, nor suggests a structure or method to provide a fiber laser harmonic frequency conversion device having a stable output.

Accordingly, a fiber laser and harmonic frequency conversion module, having a stable output power remains highly desirable. It is a further object to provide a fiber laser harmonic frequency conversion module having reduced temperature sensitivity.

SUMMARY OF THE INVENTION

The present invention has identified a combination of factors in the structure of a fiber laser harmonic frequency conversion module which contribute to the output power fluctuation. The temperature dependent phase change of light transmitted in a PM fiber optical coupling is significant because the fiber laser does not have perfect PER (polarization extinction ratio). Two most common causes of the PER degradation are stress applied on the PM fiber and misalignment of the PM fiber to the diode and the non linear crystal. Stress caused by packaging surrounding the grating may also contribute to PER degradation. This PER degradation results in light of both linear polarization states coupling into the PM fiber link. Light coupled into the fast and slow axes will arrive with a phase difference. If there are at least two PER degradation points, a mix of polarizations on each axis can result, causing interference. The relative phase difference changes with temperature altering the interference and changing the amount of light coupled the harmonic frequency converter. The result is seen as amplitude fluctuation in the harmonic frequency converter output.

The present invention has found that incorporating at least one 90 degree splice of the transmission axes of the PM fiber, coupling a fast axis to a slow axis, to create substantially equal optical path lengths of the two transmission axes of the fiber coupling can nearly eliminate this output amplitude fluctuation within a practical operating temperature range. Reducing the phase difference between the 2 PM fiber polarizations reduces the number of power oscillations or fluctuations of the frequency doubled power within a temperature range.

The invention does not prevent the light interference that occurs at the output of the two spliced PM fibers, but it increases significantly the temperature interval (beat period)

over which the component of pump light polarization that generates the harmonic frequency conversion cycles between its maximum and minimum values, thereby decreasing the sensitivity of the frequency converted output to temperature changes that are smaller than the temperature change corresponding to a beat period. In a preferred embodiment, the structure in accordance with the present invention reduces the power fluctuation to less than one over a practical operating temperature range. A preferred operating range is between about 5 degrees C. to about 45 degrees C., but this may be extended to a range of about 75 degrees C.

Accordingly, the present invention provides an optical harmonic frequency conversion module comprising:

a semiconductor fiber laser generating a substantially linearly polarized light output;

a non-linear crystal waveguide device for converting the light output from the semiconductor fiber laser having a first frequency into an output light having a second frequency; and an optical fiber link for coupling the substantially linearly polarized light output from the semiconductor fiber laser into the non-linear crystal waveguide device, the optical fiber link comprising birefringent optical fiber having a fast axis, and a slow axis orthogonal thereto, wherein the optical fiber link includes at least one 90 degree splice fusing a fast axis of a first segment of birefringent optical fiber to a slow axis of a second segment of birefringent optical fiber, wherein light launched in a fast axis of the optical fiber link has a substantially equal optical path length as light launched into a slow axis of the optical fiber link.

An embodiment of the invention further provides an optical harmonic frequency conversion module wherein the first segment L1 of the optical fiber link is coupled by a 90 degree splice to the second segment L2, such that L1 is approximately equal to L2.

An alternative embodiment provides an optical harmonic frequency conversion module as defined in claim 1, wherein the optical fiber link comprises a first segment L1 optically coupled with a first 90 degree splice to a second segment L2 optically coupled with a second 90 degree splice to a third segment L3, such that L2 is substantially equal to L1+L3.

Preferably the present invention provides an optical harmonic frequency conversion module wherein the optical fiber link includes two major PER (polarization extinction ratio) degradation points and the at least one 90 degree splice is disposed such that light launched into a fast axis of the optical fiber link has a substantially equal optical path length between the two major PER degradation points as light launched into a slow axis of the optical fiber link.

A further preferred embodiment of the invention comprises an optical harmonic frequency conversion module wherein the non-linear crystal waveguide device comprises a second harmonic generator (SHG).

A further preferred embodiment of the present invention comprises an optical harmonic frequency conversion module wherein the 90 degree splice is located such that the temperature interval between maximum and minimum output of the harmonic frequency conversion module is greater than a selected operational temperature range.

An alternative aspect of the invention provides an optical harmonic frequency conversion module comprising:

a semiconductor fiber laser generating a substantially linearly polarized light output;

a non-linear crystal waveguide device for converting the light output from the semiconductor fiber laser having a first frequency into an output light having a second frequency; and an optical fiber link for coupling the substantially linearly polarized light output from the semiconductor fiber laser into the non-linear crystal waveguide device, the optical fiber link comprising a birefringent optical fiber having a fast axis and a slow axis orthogonal thereto, the optical fiber link further comprising a first segment L1 optically coupled to a second segment L2 such that a fast axis of L1 is coupled to a slow axis of L2, and wherein $$\frac{2\pi \times L \times \Delta n(T)}{\lambda} < 2\pi$$

where L is the difference L1-L2, T is the operating temperature range, $\lambda$ is the wavelength, and $\Delta n(T)$ is the PM fiber birefringence which is temperature dependent, such that an output of the non-linear crystal has less than one power oscillation within a selected operational temperature range.

More particularly the present invention defines an optical harmonic frequency conversion module as described above, wherein a selected operational temperature range is less than 75 degrees C.

A further aspect of the present invention provides an output birefringent optical fiber for coupling light at a second frequency from the non-linear crystal waveguide device, the output birefringent fiber including at least one 90 degree splice such that light coupled into a fast axis of the birefringent optical fiber output from the non-linear crystal waveguide device has a substantially equal optical path length as light coupled into a slow axis of the birefringent optical fiber output.

BRIEF DESCRIPTION OF THE DRAWINGS

Further features and advantages of the present invention will become apparent from the following detailed description, taken in combination with the appended drawings, in which:

FIG. 2A is a schematic illustration of an optical PM fiber link in accordance with the present invention;

FIG. 2B is an alternative schematic illustration of an optical PM fiber link in accordance with the present invention;

It will be noted that throughout the appended drawings, like features are identified by like reference numerals.

DETAILED DESCRIPTION OF THE PREFERRED EMBODIMENT

Second harmonic generation (SHG) is a commonly practiced technique for obtaining coherent light at short wavelengths from long wavelength laser sources. It is a non-linear process where an optical beam, called the pump beam, interacts with an optically non-linear medium, in the case of second harmonic generation, to generate a second harmonic beam, where the frequency of the second harmonic beam is twice the frequency of the pump beam. Equivalently, the free space wavelength of the second harmonic is half the free space wavelength of the pump. Any material which lacks inversion symmetry can be used as the optically non-linear medium for second harmonic generation. Materials which are commonly used include lithium niobate, MgO-doped lithium niobate and KTP (KTiOPO$_4$). Second-harmonic generation is one of a class of methods, known collectively as non-linear frequency mixing, or harmonic frequency conversion which employ similar ridge waveguide optical structures to generate or amplify coherent light at a desired wavelength from light at an input, or from a pump. Other examples include SFG (Sum Frequency Generation) or Third Harmonic Generation crystals.

In fact the optical link in accordance with the present invention can provide temperature stabilization to any polarization alignment sensitive element, such as a polarizer.

Figure 1:
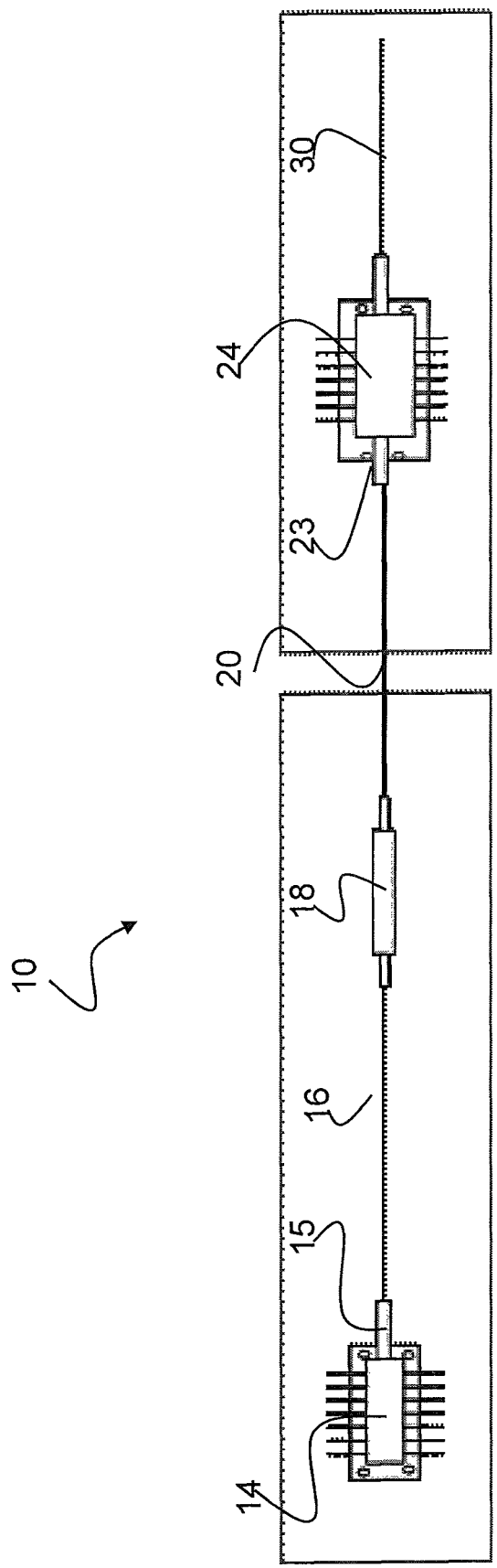
FIG. 1 is an illustration of a harmonic frequency conversion module.

A harmonic frequency conversion module is shown in FIG. 1 generally at 10. The harmonic frequency conversion module 10 includes a semiconductor fiber laser 12 including a semiconductor diode 14, an external cavity of optical fiber 16 and a grating 18, such as a fiber Bragg grating. An optical coupling 20 of PM fiber couples the semiconductor fiber laser 12 to a harmonic frequency converter 24 including a non-linear crystal (not shown). The optical fiber coupling 20 may be a single PM fiber from the diode 14 to the harmonic frequency converter 24. Output fiber 30 couples the output light of the converted wavelength from the module 10.

Figure 3B:
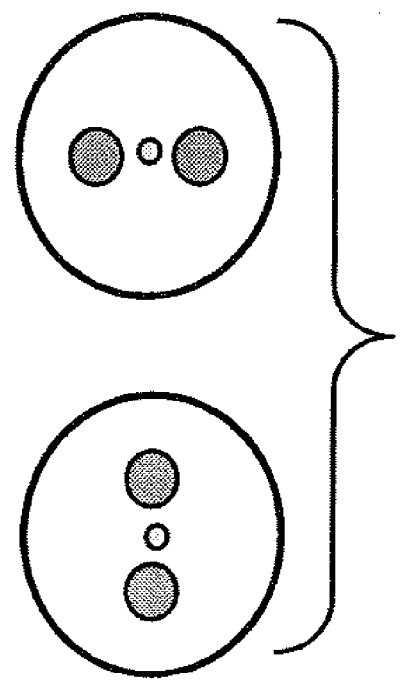
FIG. 3B is a cross-section of two PM fiber sections as disposed at a 90 degree fiber splice.
Figure 3A:
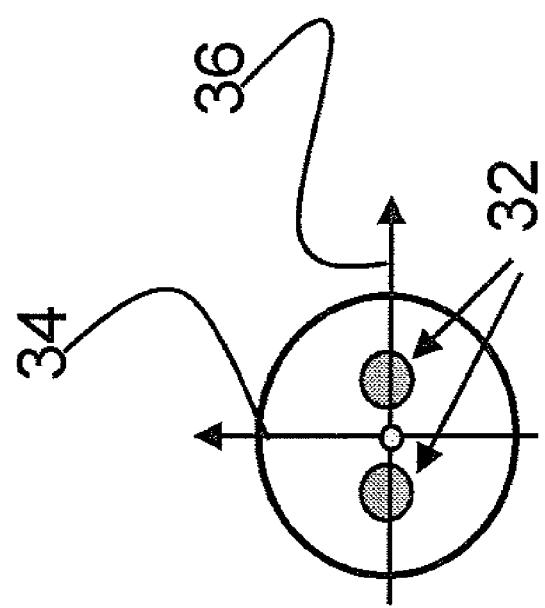
FIG. 3A is a cross-section of a PM fiber.

Although the PM fiber 20 is intended to maintain the polarized output of the fiber laser 12, the output of a fiber laser does not actually have a perfect polarization extinction ratio (PER). This is due to stress applied on the PM fiber 20, particularly at the coupling, or because the alignment of the fiber 16 to the laser chip 14 is not perfect, or a combination of these factors. A cross section of a PM fiber 20 is shown in FIG. 3A. This is an illustration of Panda fiber manufactured by Corning Incorporated or Fujikura Ltd. having stress rods 32 contributing a known birefringence to the fiber 20, and defining a fast axis 34 and a slow axis 36. Numerous other birefringent fiber designs exist, from manufacturers such as FEC, Nufern, which similarly include fast and slow axes.

Optical-coupling schemes that require high efficiency typically utilize a lensed fiber that is attached to a substrate in close proximity to the light source (e.g., laser diode), or discreet bulk lenses between the laser and the fiber. In both cases, the fiber is attached some minimum distance (~0.5 mm) away from the fiber termination. Typical attachment means include eutectic and glass solders, both of which have geometries that create asymmetrical stresses in both the fiber and the solder. Residual stresses induced in PM fiber can alter the intrinsic birefringence of the fiber, thus degrading the PER.

Due to non perfect PER, the fiber laser 12 emits two polarizations, one traveling along the slow fiber axis 36 and the other along the fast fiber axis 34 of the PM fiber 20. PM fiber transmits both orthogonal linear polarization states equally in either axis, with a phase difference between the fast and slow axes as a function of L, the propagation length in the PM fiber, the lasing wavelength, and the PM fiber birefringence given by the following equation:

$$\Delta\Phi = 2\pi \cdot L \cdot \Delta n / \lambda$$

If the structure includes at least two locations with PER degradation or misalignment along the PM fiber module (e.g. Diode to PM fiber joint and PM fiber to frequency converter joint) the light transmitted on each axis of the PM fiber, after going through these 2 PER misalignment spots, will be a mix of two polarizations which will interfere if laser coherence allows it.

Since the non-linear crystal converts only one polarization to the longer wavelength, light that has arrived in the opposite polarization state is discarded. The orientation of the converted polarization, horizontal or vertical, depends on the cut of the non-linear crystal.

Changing temperature causes the birefringence of PM fiber, the $\Delta n$ difference in refractive index between the orthogonal axes, to vary with the result that the phase difference of the transmitted orthogonal polarizations also changes. Changing phase difference alters the interference which occurs in turn changing the amount of light of the correct polarization entering the harmonic frequency converter, and leading to fluctuations in the output power.

The problem solved is the phase difference temperature dependence and therefore the power temperature dependence of such modules as the birefringence of PM fiber is temperature sensitive. The birefringence temperature dependence of 980 nm Panda fiber has been measured at:

$$\frac{1}{\Delta n} \frac{d\Delta n}{dT} = 0.6 \times 10^{-6} C^{-1}$$

The PM fiber link 20 is measured from the diode 14 to the non-linear crystal 24. A portion of this makes up the external cavity of the laser 16. However, the optical link 20 must be considered from the optical fiber coupling to a next optical fiber coupling as these are the points of greatest PER degradation.

As shown in FIG. 2A, L1 comprises a first segment of PM optical fiber 20. A first stress point 15 of PER degradation is at the optical fiber coupling to the laser diode 14. A second stress point 23 of PER degradation is located at the optical fiber coupling to the harmonic frequency converter 24. The 90 degree optical splice is shown at 50, and the second segment L2 is optically fused to L1 with a fast axis 34 of the segment L2 coupled to a slow axis 36 of the fiber segment L1. The best temperature stability is achieved when the optical link comprises L1 equal in optical path length to L2. Alternatively, good temperature stability can also be achieved with two or more 90 degree splices, as long as equal optical path lengths are maintained for each optical path in the optical link. For instance, as shown in FIG. 2B, L2=L1+L3.

Harmonic conversion modules are designed to operate over a selected temperature range, for instance within an operating range of 50 degrees C. By reducing the phase difference between the two axes of the optical link 20 the number of power oscillations from maximum to minimum over the selected temperature range can be reduced to less than one. Depending on the temperature range and the operating specifications, the splice can create approximately equal optical path lengths and still provide the desired power stabilization function. If the temperature interval between maximum and minimum output is greater than the operational temperature range a stabilizing function can be observed. In this case, the splice 50 or splices are located such that less than one power oscillation occurs over the operational temperature range.

It is preferred to identify the major points of PER degradation for a specific module design. If the optical path lengths are equalized for the two axes of the optical fiber link 20 between the major PER degradation points, the best power stabilization can be achieved. This depends on the module design. PER degradation may occur at the optical fiber end alignment to the laser diode 14 or the non-linear crystal device 24. Other major sources of PER degradation can include stress from solder at a fiber mount, or at a hermetic seal. Thus, the point of PER degradation can move from one or other fiber ends shifting the optimum splice point slightly.

Figure 4:
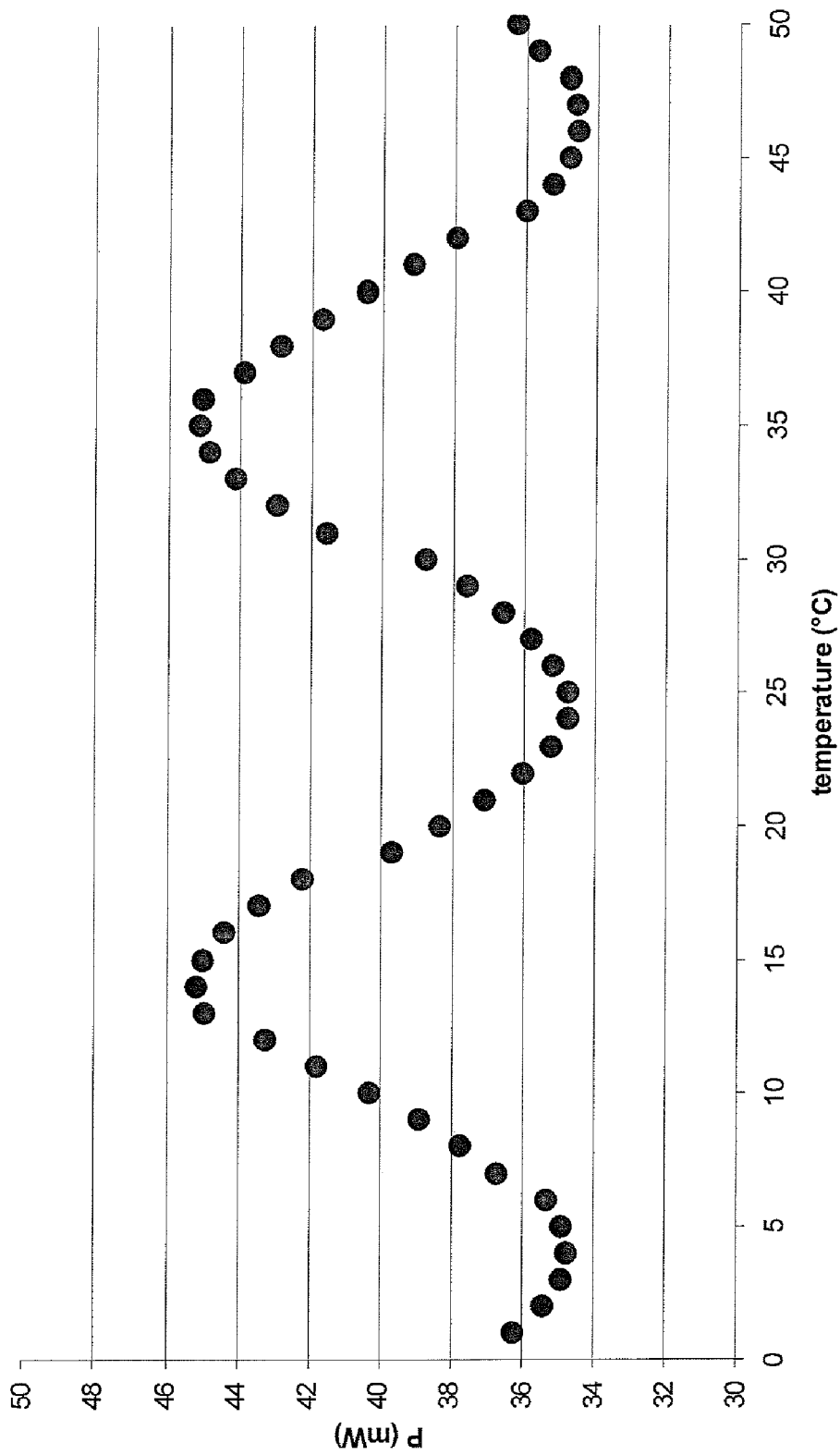
FIG. 4 is a graph illustrating the output power fluctuation versus temperature change in the PM fiber optical link of a harmonic frequency conversion module.

The graph in FIG. 4 illustrates an example of SHG power oscillation with change of the PM fiber temperature, in a PM fiber optical link without a 90 degree splice. In this example the temperature is controlled using a thermoelectric cooler (TEC) over a short section of the PM fiber between the pump module and the SHG module. The results show about 30% output power fluctuations ((max Power−min Power)/mean power); the temperature x-axis is the TEC temperature (temperature of the 10 cm of PM fiber) and the power y-axis is the recorded output power at different fiber temperatures.

Figure 5:
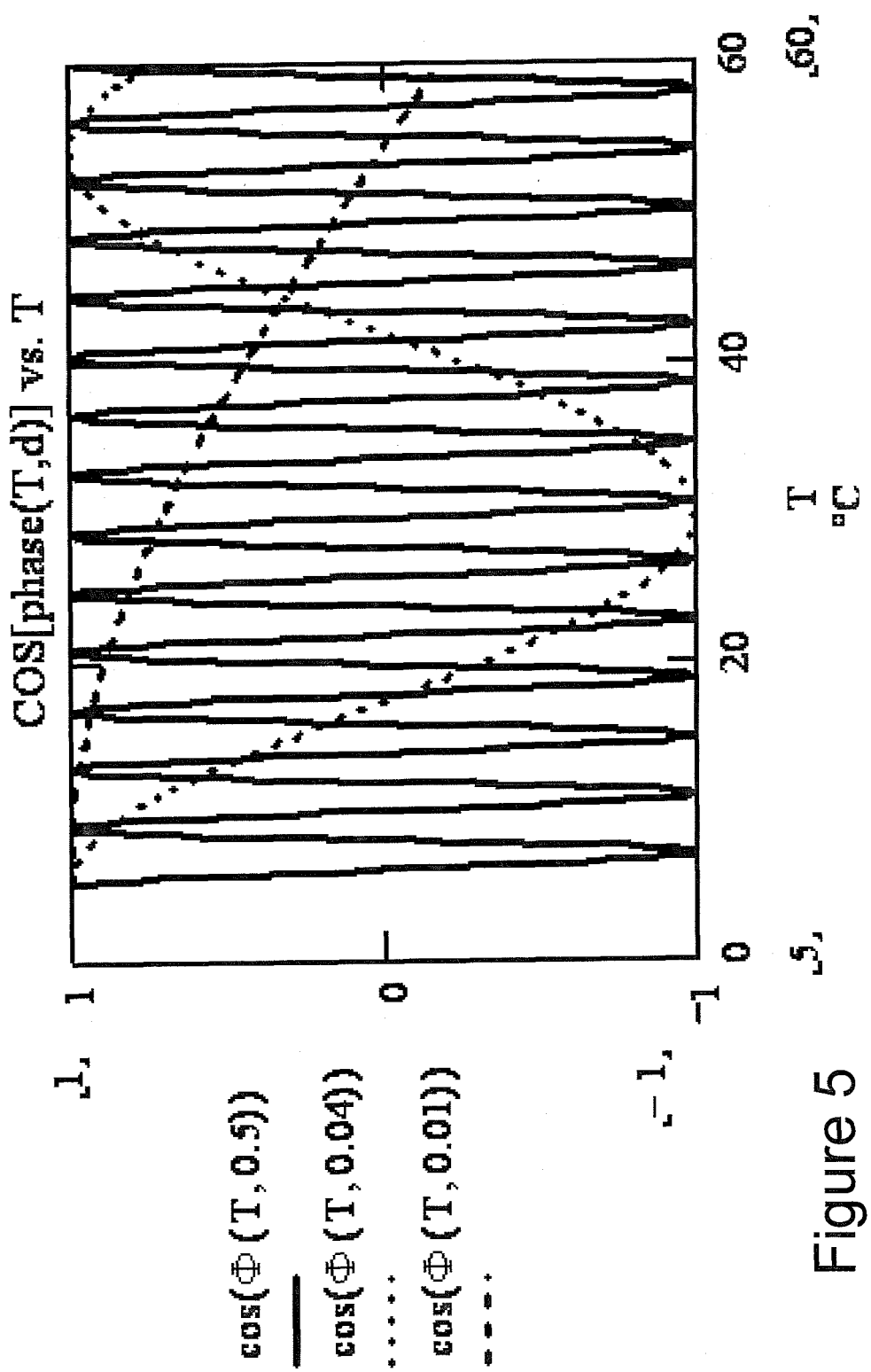
FIG. 5 is a graph plotting the cosine of the phase difference between slow and fast polarization versus temperature for different fiber lengths and splice orientation of optical fiber links within a harmonic frequency conversion module.

The graph in FIG. 5 shows the cosine of the phase difference between the fast polarization and slow polarization axes of 980 nm Panda fiber for different fiber length versus temperature. In each case 50 cm of fiber are coupled between a 980 laser diode and 980 frequency doubler. As show at 100, the solid line, L1 is equal to L2 with a standard splice with no rotation. The fast axis of L1 is fusion coupled to the fast axis of L2. This structure exhibits approximately 14 power oscillations over a temperature change from 5 degrees C. to 60 degrees C. By comparison, as shown at 102, the dashed line, a spliced fiber having a 90 degree rotation coupling the fast axis of L1 to the slow axis of L2, and L1−L2=4 cm in a 50 cm link, the power oscillations have been reduced to approximately one. At 104, the segmented line, also having a 90 degree splice, with L1−L2=1 cm in a 50 cm link, the power oscillations are further reduced to about a quarter of an oscillation period.

A range of suggested wavelengths for a second harmonic frequency conversion module constructed in accordance with the present invention include: 405 nm, 488 nm, 505 nm, 560 nm and 590 nm.

Figure 6:
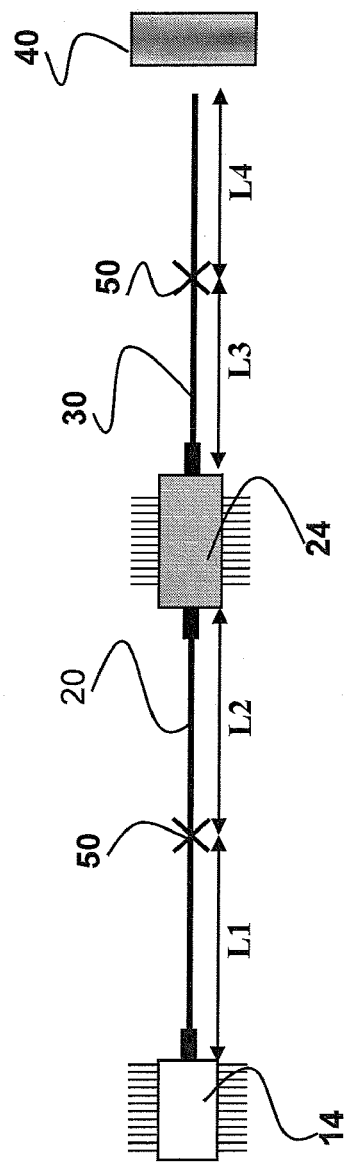
FIG. 6 is a schematic illustration of a further embodiment of the present invention, including a polarization stabilized PM fiber output into a polarizer.
Figure 7:
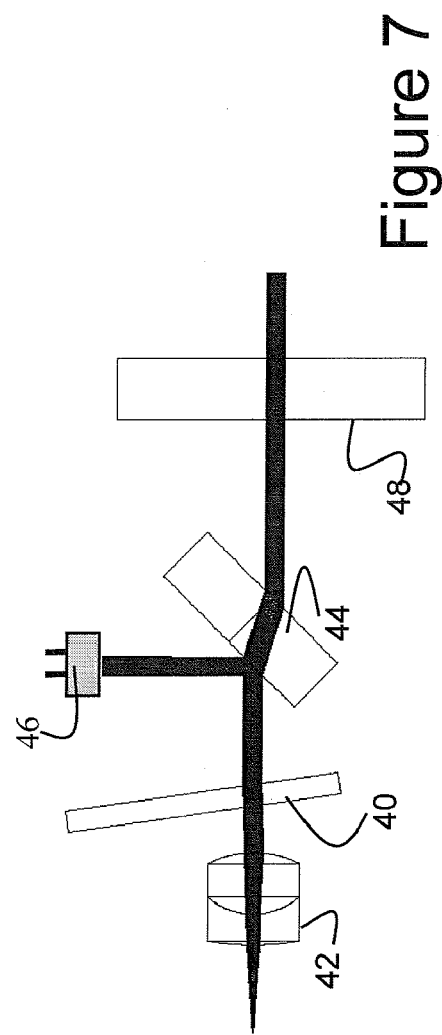
FIG. 7 is a detailed illustration of a polarizing subsystem comprising the polarizer of FIG. 6.

A further embodiment of the present invention is shown in FIGS. 6 and 7 in which the output fiber 30 comprises a PM optical fiber having one or more 90 degree splices 50. This structure substantially stabilizes the output power of the converted wavelength. This is particularly important if the output is coupled through a polarizer 40 into an optical system. The splice or splices 50 again are arranged to provide substantially equal optical path lengths between the PER disruption point. The largest polarization disruption being attributable to solder at the fiber holder or ferrule. Depending on the design, the PER disruption may occur a small distance from the aligned fiber endpoint. As illustrated in FIG. 7 a polarizer 40 may comprise a subsystem including a polarizer 40. Following the output fiber 30 a collimating lens 42 focuses the converted light output onto a polarizer 40. Light passing through the polarizer 40 is directed to a polarizing beam splitter (PBS) 44 and the unwanted polarization is tapped off to a photodetector 46 for power monitoring. The stabilized output light at the conveted wavelength passes out through a protection window 48.

The embodiment(s) of the invention described above are intended to be exemplary only. The scope of the invention is therefore intended to be limited solely by the scope of the appended claims.

What is claimed is:

1. An optical harmonic frequency conversion module comprising:
   a semiconductor fiber laser generating a substantially linearly polarized light output;
   a non-linear crystal waveguide device for converting the light output from the semiconductor fiber laser having a first frequency into an output light having a second frequency; and
   an optical fiber link for coupling the substantially linearly polarized light output from the semiconductor fiber laser into the non-linear crystal waveguide device, the optical fiber link comprising birefringent optical fiber having a fast axis, and a slow axis orthogonal thereto, wherein the optical fiber link includes at least one 90 degree splice fusing a fast axis of a first segment of birefringent optical fiber to a slow axis of a second segment of birefringent optical fiber, wherein the optical fiber link includes two major PER (polarization extinction ratio) degradation points and the at least one 90 degree splice is disposed such that light launched into a fast axis of the optical fiber link has a substantially equal optical path length as light launched into a slow axis of the optical fiber link between the two major PER degradation points.

2. An optical harmonic frequency conversion module as defined in claim 1, wherein the non-linear crystal waveguide device comprises a second harmonic generator (SHG).

3. An optical harmonic frequency conversion module as defined in claim 2, wherein the optical fiber link comprises an optical fiber having a fiber Bragg grating (FBG) written therein.

4. An optical harmonic frequency conversion module as defined in claim 3, wherein the 90 degree splice is located such that the temperature interval between maximum and minimum output of the harmonic frequency conversion module is greater than a selected operational temperature range.

5. An optical harmonic frequency conversion module as defined in claim 4, wherein the at least one 90 degree splice comprises at least one fusion splice.

6. An optical harmonic frequency conversion module as defined in claim 4, wherein a selected operational temperature range is less than 75 degrees Celsius.

7. An optical harmonic frequency conversion module as defined in claim 4 further including an output birefringent optical fiber for coupling light at a second frequency from the non-linear crystal waveguide device, the output birefringent fiber including at least one 90 degree splice such that light coupled into a fast axis of the birefringent optical fiber output from the non-linear crystal waveguide device has a substantially equal optical path length as light coupled into a slow axis of the birefringent optical fiber output.

8. An optical harmonic frequency conversion module as defined in claim 7 further including a polarizer coupled to an output end of the birefringent optical fiber output.

9. An optical harmonic frequency conversion module as defined in claim 8 further including a polarizing beam splitter for separating light from the polarizer and directing an unwanted polarization of the separated light to a photodetector for power monitoring.

10. An optical harmonic frequency conversion module as defined in claim 4, wherein the first segment L1 of the optical fiber link is coupled by a 90 degree splice to the second segment L2, such that L1 is approximately equal to L2.

11. An optical harmonic frequency conversion module as defined in claim 4, wherein the optical fiber link comprises a first segment L1 optically coupled with a first 90 degree splice to a second segment L2 optically coupled with a second 90 degree splice to a third segment L3, such that L2 is substantially equal to L1+L3.

* * * * *

UNITED STATES PATENT AND TRADEMARK OFFICE
CERTIFICATE OF CORRECTION

| | | |
|---|---|---|
| PATENT NO. | : 7,826,132 B2 | Page 1 of 1 |
| APPLICATION NO. | : 12/269453 | |
| DATED | : November 2, 2010 | |
| INVENTOR(S) | : Guerin | |

It is certified that error appears in the above-identified patent and that said Letters Patent is hereby corrected as shown below:

Cover Page, Item (73) Assignee:

"JDS Eniphase Corporation" should read -- JDS Uniphase Corporation --

Signed and Sealed this
Sixteenth Day of August, 2011

David J. Kappos
*Director of the United States Patent and Trademark Office*